United States Patent [19]

Day et al.

[11] Patent Number: 5,417,854
[45] Date of Patent: May 23, 1995

[54] APPARATUS FOR SEPARATING SOLIDS FROM FLUIDS

[75] Inventors: James Day, Scotia; Ganesh Kailasam, Schenectady; Godavarthi S. Varadarajan, Niskayuna; Kenneth M. Carroll, Albany, all of N.Y.

[73] Assignee: General Electric Company, Schenectady, N.Y.

[21] Appl. No.: 175,458

[22] Filed: Dec. 29, 1993

[51] Int. Cl.⁶ .................................................. B03B 5/36
[52] U.S. Cl. ................................... 210/208; 210/221.2; 210/298; 210/302; 210/514; 210/523; 414/218
[58] Field of Search .................... 210/512.1, 523, 514, 210/525, 208, 533, 295, 787, 298, 296, 302, 221.2; 414/218

[56] References Cited

U.S. PATENT DOCUMENTS

| | | | |
|---|---|---|---|
| 3,729,105 | 4/1973 | Huebler et al. | 414/218 |
| 4,416,764 | 11/1983 | Gilkis et al. | 210/523 |
| 4,603,194 | 7/1985 | Mendiratta et al. | 528/491 |
| 4,634,761 | 1/1987 | Mendiratta et al. | 528/500 |
| 4,668,768 | 5/1987 | Mendiratta et al. | 528/493 |
| 5,160,441 | 11/1992 | Lundquist | 210/787 |
| 5,286,380 | 2/1994 | Mellen | 210/295 |
| 5,299,639 | 4/1994 | Williams et al. | |
| 5,306,807 | 4/1994 | Kailasam et al. | 528/483 |

FOREIGN PATENT DOCUMENTS

0184935A2  12/1985  European Pat. Off. .

OTHER PUBLICATIONS

Chemical Engineers' Handbook, Fifth Edition, McGraw-Hill Kogakusha, Ltd., pp. 75-85 1973.

*Primary Examiner*—Robert A. Dawson
*Assistant Examiner*—David Reifsnyder
*Attorney, Agent, or Firm*—Edward A. Squillante, Jr.; William H. Pittman

[57] ABSTRACT

A novel apparatus for isolating solids or wetcakes from fluids is disclosed. Said apparatus is closed to the atmosphere and comprises a slip joint and a floating auger which allows for solid recovery under pressure in the absence of substantial solvent volatilization.

11 Claims, 2 Drawing Sheets

APPARATUS FOR SEPARATING SOLIDS FROM FLUIDS

FIELD OF THE INVENTION

This invention relates to a novel apparatus for removing solids from fluids. More particularly, said apparatus comprises a slip joint and a floating auger which allows for solids or wet cakes to be separated from liquids under pressure.

BACKGROUND OF THE INVENTION

For over a hundred years it has been well recognized that naturally occurring processes are inherently mixing processes and that the reverse procedure, unmixing or separation processes, typically creates challenging problems for engineers and the like. Nonetheless, many processes and apparatuses have been developed in order to transform a mixture of substances into two or more products which differ from each other in composition.

Conventional techniques which induce precipitation of solids from solutions in order to produce mixtures include crystallization, centrifugation, clarification and separation agent employment. Subsequent to mixture formation, the solids are separated from liquids by typical methods including evaporation, filtration, decanting and absorption. Such methods can be environmentally hazardous since they often require the vaporization and transporting of toxic solvents as well as the employment of expensive reagents. Moreover, known separation devices usually perform at atmospheric pressure or pressures lower than atmospheric and they often require temperature elevation before any solids may be separated from fluids.

The instant invention, therefore, relates to a novel apparatus for removing solids from fluids. More particularly, the apparatus comprises a slip joint and a floating auger which allows for solids and liquids to be isolated from one another (batch or continuously) under pressure without employing inefficient, energy intensive and environmentally unfavorable steps.

DESCRIPTION OF THE PRIOR ART

Apparatuses for isolating solids from solution have been disclosed in the art. In commonly assigned U.S. Pat. Nos. 4,603,194 and 4,634,761, volatilization vessels open to the atmosphere are disclosed. Said vessels comprise feed ports, outlet ports and impellers, wherein polymer solutions are fed into the vessel and heated in order to obtain polymer slurries which are subsequently centrifuged and dried in order to recover solid polymer.

Additionally, in commonly assigned U.S. Pat. No. 4,668,768, an evaporation vessel is described. Said evaporation vessel is charged with an organic solvent comprising polymer and an organic anti-solvent wherein a powdery polymer precipitate is recovered subsequent to vaporization.

In allowed U.S. Pat. No. 5,306,807, efforts are disclosed for isolating polymers from solutions by subjecting the solutions to carbon dioxide, wherein the disclosure of said allowed application is incorporated herein by reference.

Still other investigators have focused on the recovery of solids from solution. In European Patent Application 0,184,935 polymer resins are isolated from solution by charging a holding tank with a polymer solution and adding carbon dioxide containing fluids.

The instant invention is patentably distinguishable from the above-described since, among other reasons, it is directed to an apparatus for separating solids from fluids wherein said apparatus comprises a slip joint and a floating auger which allows for solids and liquids to be separated under pressure. Moreover, in the instant invention, fluids are defined as liquids, solutions comprising solids and/or gases dissolved therein, suspensions and emulsions. Further, fluids in the instant invention can mean mixtures of miscible or immiscible solvents.

SUMMARY OF THE INVENTION

Generally speaking, the instant invention relates to an apparatus for separating solids from fluids in a mixing vessel from a solution or mixture comprising the same. Said apparatus allows for solid and fluid separation without the need for inefficient, energy intensive and environmentally unfavorable steps such as evaporation/volatilization of substantially all liquids (organic solvents) present in the system, the necessary employment of anti-solvents and the employment of expensive separation/precipitation agents. Further, the instant apparatus may function at a variety of temperatures; however, ambient temperature is often preferred.

The needs of the instant invention are met by the above-described novel apparatus which comprises a mixing vessel (closed to the atmosphere) and a barrel which is connected to said mixing vessel. It is often preferred that the barrel is horizontal and perpendicular to said mixing vessel. However, any arrangement which allows for solid particles in the mixing vessel to enter the barrel will work; especially in the case where the solid particles are less dense than the fluid. The mixing vessel typically comprises solution/mixture and gas component inlets, a particle passage attached towards the back of said barrel, a filter attached to an outlet component and an optional motor driven agitator. The gas supplied via the gas component inlet may be either pure gas or gas dissolved in solvent.

The barrel comprises, internally, a slip joint in which a posterior shaft of a floating auger is inserted. Said floating auger comprises flights and said slip joint comprises a slip joint drive shaft attached to a motor drive which is employed to rotate the slip joint and auger inside the barrel. The posterior portion of said slip joint and the anterior portion of said auger are conical. The anterior portion of said barrel and posterior portion of said barrel each comprise an annular seat inserted therein. The anterior annular seat acts as a rest for the conical anterior portion of said auger and the posterior annular seat acts as a rest for the conical posterior portion of said slip joint. The anterior annular seat of the barrel and the conical anterior portion of the auger, together, act as an anterior dynamic seal for the barrel. The posterior annular seat of the barrel and the conical posterior portion of the slip joint, together, act as a posterior dynamic seal for the barrel.

It is particularly noted in the instant invention that floating auger means an auger that can rotate while simultaneously sliding back and forth inside the slip joint. Thus, the slip joint is a mechanism that transmits torque to the floating auger as the posterior shaft of said floating auger is free to move inside the slip joint. Moreover, the posterior shaft of said floating auger fits into the motor driven slip joint so that the auger will rotate. Such a fit may be a splined fit or any other conventional mechanism/fit which allows for rotation and movement of the floating auger.

Additional features and advantages of the present invention will become apparent upon reading the following detailed description and the appended claims with reference to the accompanying figures.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
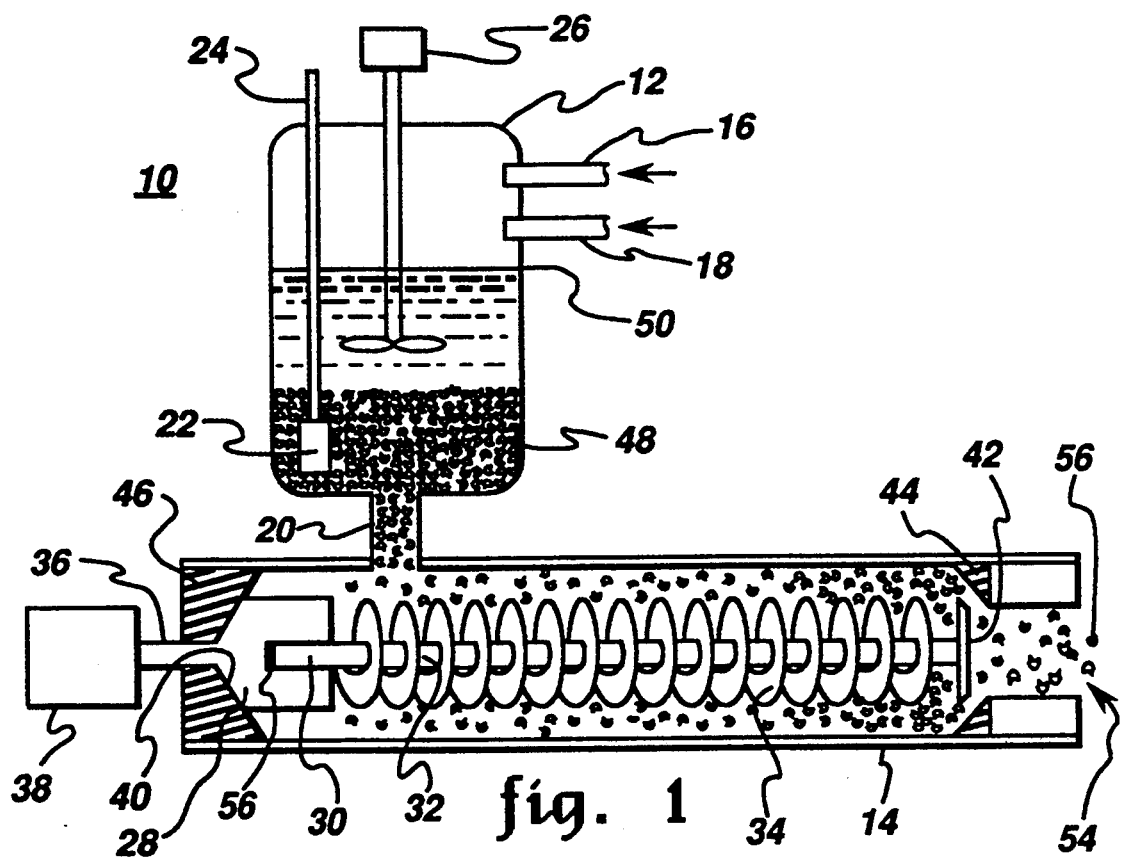
FIG. 1 is a schematic drawing of a side view of the apparatus of the present invention. It depicts the posterior shaft of the floating auger fully inserted into the anterior portion of the slip joint which allows for particle removal at the anterior portion of the barrel.

Referring to the figures, an apparatus 10 for separating solids from fluids is shown. The apparatus 10 comprises a mixing vessel 12 and a barrel 14 which is connected to said mixing vessel 12. The mixing vessel 12 comprises a solution/mixture component inlet 16 and a gas component inlet 18. The mixing vessel 12 further comprises a particle passage 20 attached to said barrel 14, a filter 22 attached to a valve controlled outlet component 24 and an optional motor driven impeller 26.

The barrel 14 comprises, internally, a slip joint 28 in which a posterior shaft 30 of a floating auger 32 is inserted. Said floating auger comprises flights 34 and said slip joint comprises a drive shaft 36 attached to a motor drive 38 which rotates said slip joint 28 and said floating auger 32 inside the barrel 14. The posterior portion 40 of said slip joint 28 and the anterior portion 42 of said auger 32 are conical in shape. The anterior and posterior portions of said barrel 14 comprise annular seats, 44 and 46 respectively, inserted therein. The anterior annular seat 44 of the barrel 14 acts as a rest for the conical anterior portion 42 of said auger 32 and the posterior annular seat 46 of the barrel 14 acts as a rest for the conical posterior portion 40 of said slip joint 28. The posterior annular seat 46 of the barrel 14 and the conical posterior portion 40 of the slip joint 28, together, act as a posterior dynamic seal for the barrel 14. The anterior annular seat 44 of the barrel 14 and the conical anterior portion 42 of the auger 32, together, act as an anterior dynamic seal for the barrel 14.

The instant invention is not limited to particular solids or fluids being separated. If in fact a solution is introduced into the mixing vessel 12 by way of the solution/mixture component inlet 16, the gas being supplied into said gas component inlet 18 generally induces precipitation of solid from the solution. In this instance, the gas typically dissolves in the solution resulting in solid precipitation, and a motor driven impeller 16 may be employed in order to enhance the gas dissolution. However, if a mixture (solid and liquid) is supplied to the mixing vessel 12 via the solution/mixture component inlet 16, the gas is not employed to induce precipitation in the mixture since solid to be isolated is present. Moreover, the mixture could, if desired, be directly fed into the barrel without employing the mixing vessel.

Figure 3:
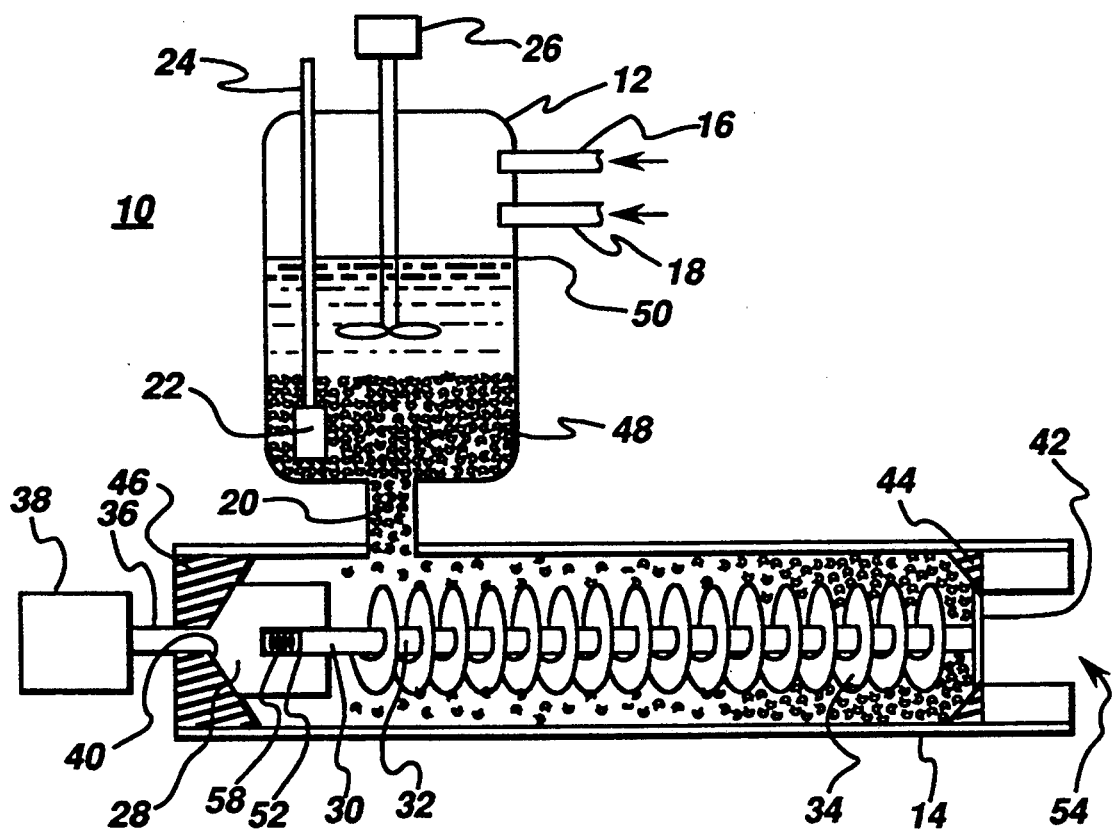
FIG. 3 is a schematic drawing of a side view of the apparatus of the present invention. It depicts a spring inserted in the slip joint which applies pressure to the slip joint and floating auger.

In all instances, however, it is preferred to supply a gaseous component to the mixing vessel 12 via the gas component inlet 18 since the pressure inside the mixing vessel must be greater than external pressure in order for the apparatus to function. Nonetheless, if a gaseous component is not supplied, the apparatus may still function by placing a spring 58 (FIG. 3) inside the slip joint to provide pressure on the posterior shaft 30.

Subsequent to charging the mixing vessel 12 with solution/mixture and gas, solid particles 48 settle to the bottom of the mixing vessel 12 and pass through the particle passage 20 into said barrel 14. The density of the solid particles causes the particles to enter the barrel 14. It is noted that the fluid level 50 remains constant in the mixing vessel 12. This is accomplished by the passage of liquid or liquid and gas under pressure through the filter 22 and into the valve controlled outlet component 24.

Figure 2:
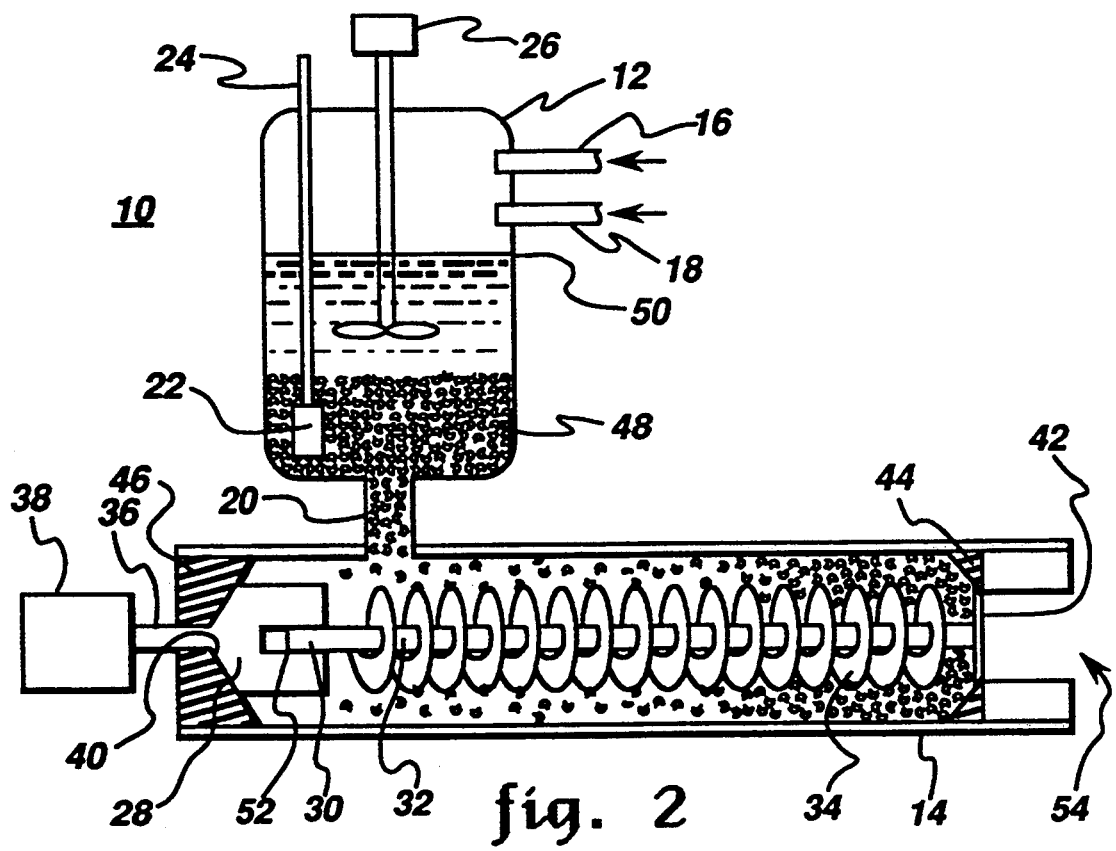
FIG. 2 is a schematic drawing of a side view of the apparatus of the present invention. It depicts the posterior shaft of the floating auger partially inserted into the anterior portion of the slip joint which prevents particle removal at the anterior portion of the barrel.

There are three forces acting upon the auger 32. The first force ($F^1$) is created by the pressure produced by the gas entering the mixing vessel 12 via the gas component inlet 18. $F^1$, the force created by gas pressure, is greater than the external pressure acting on the mixing vessel and it causes the posterior shaft 30 of the floating auger 32 to slide forward within the slip joint 52 (FIG. 2) which causes the conical anterior portion of the auger 42 to press against the anterior annular seat of the barrel 44. Hence, $F^1$ pushes the auger towards the barrel opening 54. This, in turn, seals the barrel opening 54 preventing liquid, gas and solid particles from exiting the barrel 14. The second force ($F^2$) is the external pressure acting upon the conical anterior portion of the auger through the barrel opening 54. $F^2$ acts in a direction opposite $F^1$. Since $F^1$ is greater than $F^2$, the barrel opening 54 remains sealed.

As solid particles 48 begin to enter the barrel 14, the rotation of the floating auger 32 (and inherently its flights 34) via the motor drive 38 and slip joint 36 causes the solid particles 48 entering the barrel 14 to move in the direction of the barrel opening 54. As the solid particles collect/congregate at the anterior end of the barrel 14, near the barrel opening 54, a third force ($F^3$) is created as a result of particle congregation and the rotation/screw action of the floating auger 32. Hence, $F^3$ is a reaction force produced by rotation of the floating auger and packing of solid particles. $F^3$ works in a direction opposite $F^1$ and in the same direction as $F^2$. When enough solid particles 48 collect/congregate at the anterior end of the barrel 14, the sum of $F^2$ and $F^3$ becomes greater than $F^1$. This pushes the floating auger 32 towards the posterior end of the barrel 14 such that the posterior shaft 30 slides backwards 56 (FIG. 1) in the slip joint 28. This causes the conical anterior portion of the auger 42 to move away from the anterior annular seat of the barrel 44 which prevents the barrel 14 from being sealed. Hence, solids (or wetcake) are recovered 56 from the barrel 14 through the barrel opening 54. Further, as solids 56 are recovered (thus depleting the amount of solids congregated at the anterior portion of the barrel), $F^1$ approaches then exceeds the sum of $F^2$ and $F^3$ causing the barrel to seal and the process to begin again.

In the instant invention an external mechanical mechanism may be employed in order to regulate $F^2$. Illustrative examples of such mechanisms (not shown) include a piston/cylinder mechanism which externally acts upon the conical anterior portion of the auger 42 as well as pressure controlled rooms that can alter $F^2$. The mechanical mechanisms employed may be controlled by mixing vessel pressure or motor drive torque or by any other conventional technique. Moreover, it is within the scope of the invention to employ augers having a multitude of compression ratios.

The following example is provided to further facilitate the understanding of the invention and it is not intended to limit the instant invention.

EXAMPLE

A 1000 ml mixing vessel 12 equipped with a motor driven impeller 26 was charged with 200 cm$^3$ of methylene chloride. $CO_2$ at 650 psig was introduced into the vessel and the resulting mixture was stirred at 1750 rpm until equilibrium was reached. A bisphenol A polycarbonate (BPA) solution comprising 14% by weight polycarbonate and 86% by weight methylene chloride was pumped into the solution inlet 16 of the mixing vessel 12 at a rate of 50 cm$^3$/minute. The mixing vessel 12 was continuously charged with $CO_2$ at 650 psig until polycarbonate precipitated and was collected as solid particles. The solid particles entered the sealed barrel 14 of the apparatus 10 and the motor drive 38 of the apparatus 10 was started so that the floating auger 32 would rotate. Liquid was removed via an outlet 24 in order to maintain a constant liquid level 50 in the vessel. The solid particles 48 were carried towards the barrel opening 54 by flights 34 on the auger 32. They collected as a packed column near the opening 54 of the barrel 14 which created a force on the auger 32 opposite the barrel opening 54. As a result, the auger 32 was pushed in a direction opposite the barrel opening 54 releasing the seal on the barrel 14. Solid particles 56 subsequently escaped the barrel opening 54 and were recovered and dried. The particles possessed a bulk density of 16.6 lbs/ft$^3$.

What is claimed is:

1. An apparatus for separating solids or wetcakes from fluids, said apparatus comprising:
    a mixing vessel attached to a barrel by means of a particle passage and said barrel comprises:
    (i) a rotating floating auger with a posterior shaft, a conical anterior portion and flights thereon;
    (ii) a slip joint with a conical posterior portion and an anterior portion in which the posterior shaft of said floating auger inserts and said slip joint has a posterior drive shaft attached to a motor drive external to said barrel;
    (iii) an anterior annular seat;
    (iv) a posterior annular seat; and
    (v) an anterior opening.

2. An apparatus in accordance with claim 1 wherein said conical anterior portion of the floating auger and said anterior annular seat of the barrel together form an anterior dynamic seal for the barrel.

3. An apparatus in accordance with claim 1 wherein said conical posterior portion of said slip joint and said posterior annular seat of the barrel together form a posterior dynamic seal for the barrel.

4. An apparatus in accordance with claim 1 wherein said mixing vessel has a motor driven impeller.

5. An apparatus in accordance with claim 4 wherein said mixing vessel has an inlet component for solutions or mixtures.

6. An apparatus in accordance with claim 5 wherein said mixing vessel has a gas inlet component.

7. An apparatus in accordance with claim 6 wherein said mixing vessel has a valve controlled outlet component with a filter.

8. An apparatus in accordance with claim 7 wherein said mixing vessel is pressurized and closed to the atmosphere.

9. An apparatus in accordance with claim 1 wherein the posterior shaft of the floating auger moves within said slip joint.

10. An apparatus in accordance with claim 1 wherein said slip joint further comprises a spring inserted therein which applies pressure to said slip joint and the posterior shaft of the floating auger.

11. An apparatus in accordance with claim 1 wherein an external mechanical mechanism is employed to act on the conical anterior portion of the floating auger.

* * * * *